United States Patent [19]

Quinlan, Jr. et al.

[11] Patent Number: 4,795,209
[45] Date of Patent: Jan. 3, 1989

[54] PIVOTING REMOVABLE TRAY/RESTRAINT FOR BABY CARRIER

[75] Inventors: Robert L. Quinlan, Jr., Stow; Mark D. Jankowski, Akron, both of Ohio

[73] Assignee: Gerber Products Company, Inc., Fremont, Mich.

[21] Appl. No.: 183,253

[22] Filed: Apr. 8, 1988

Related U.S. Application Data

[63] Continuation of Ser. No. 3,887, Jan. 16, 1987, abandoned.

[51] Int. Cl.⁴ .............................................. A47B 83/02
[52] U.S. Cl. .................................... 297/153; 297/155
[58] Field of Search ............... 297/153, 155, 154, 162, 297/487, 488

[56] References Cited

U.S. PATENT DOCUMENTS

| | | | |
|---|---|---|---|
| 793,752 | 2/1905 | Unger | 297/153 |
| 1,361,505 | 12/1920 | Snideman | 297/153 |
| 3,006,687 | 10/1961 | Brandon | 297/153 |
| 3,212,814 | 10/1965 | Anderson | 297/155 |
| 3,335,434 | 8/1967 | Gamon | 297/153 |
| 3,547,488 | 12/1970 | Barnes | 297/154 |
| 3,917,342 | 11/1975 | Furuta | 297/468 |
| 4,643,474 | 2/1987 | Wise et al. | 297/488 |

FOREIGN PATENT DOCUMENTS 0193729  9/1986  European Pat. Off. ........... 297/488

*Primary Examiner*—Francis K. Zugel
*Attorney, Agent, or Firm*—Townsend & Townsend

[57] ABSTRACT

A tray is secured to a baby carrier in a manner which permits both pivoting and removal by use of a hinge connection combined with a releasable hook. The hinge is joined to the tray edge while the hook is inserted through a slot in the side arm of the carrier, to engage an external flange on the carrier in a locking relationship. The hook is releasable by manual pressure. In preferred embodiments, the hinge connection has two pivot axes together providing a wide arc of rotation. A latch on the opposite side of the tray, similarly releasable by manual pressure, secures the tray in place.

9 Claims, 2 Drawing Sheets

U.S. Patent   Jan. 3, 1989   Sheet 1 of 2   4,795,209
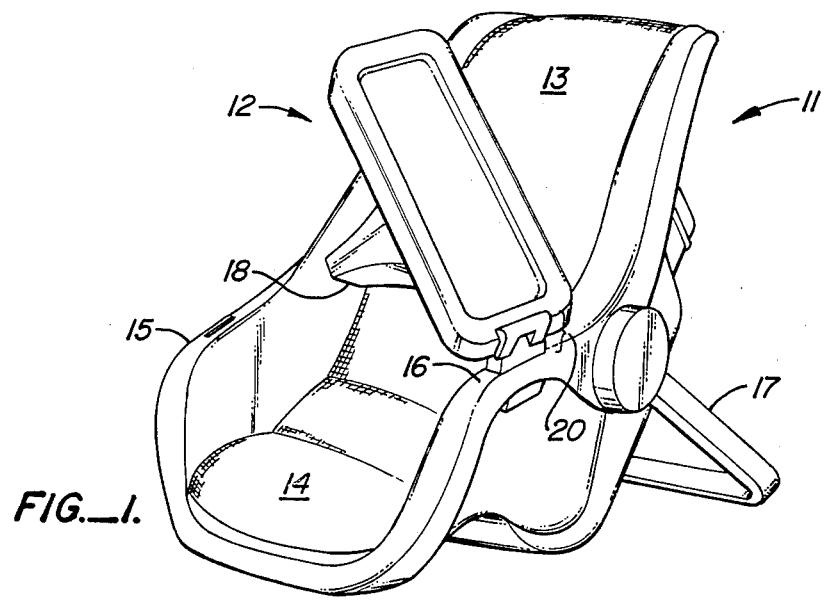
FIG._1.
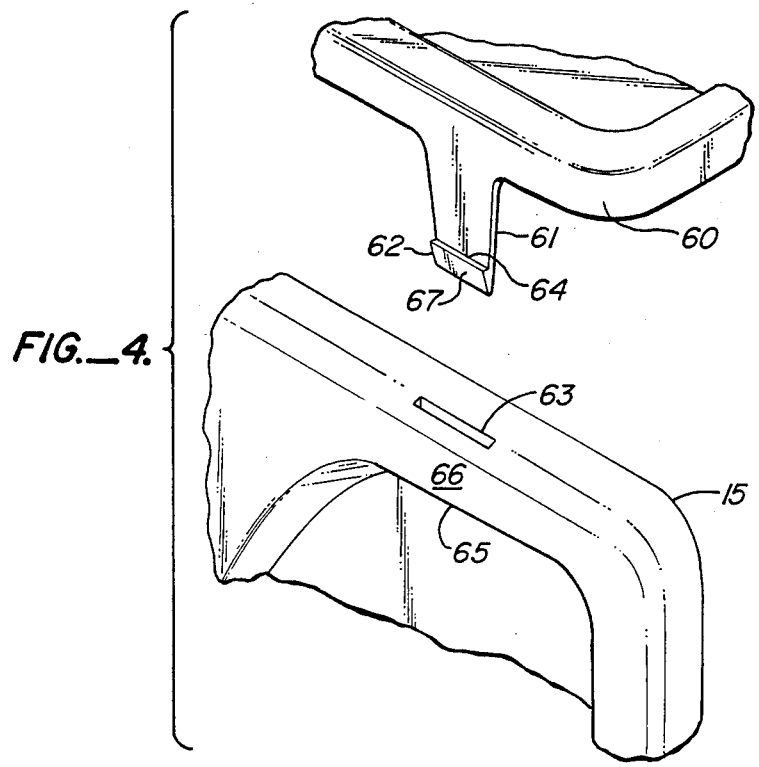
FIG._4.

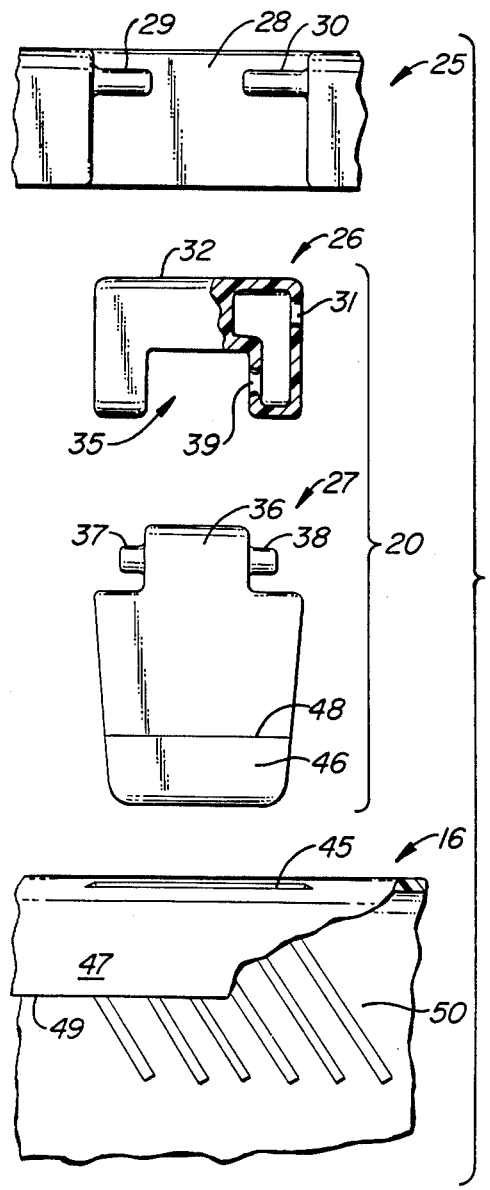
FIG._2.
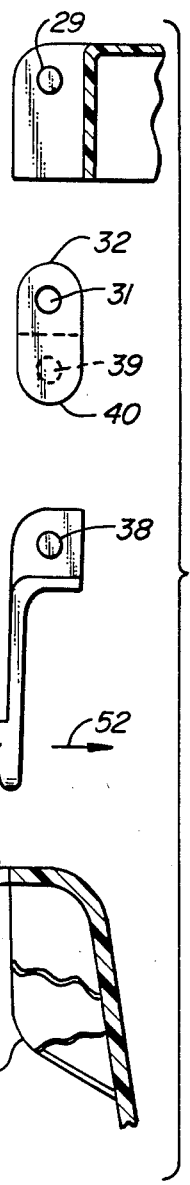
FIG._3.

PIVOTING REMOVABLE TRAY/RESTRAINT FOR BABY CARRIER

This is a continuation of application Ser. No. 07/003,887, filed Jan. 16, 1987, now abandoned.

This invention relates to baby carriers, and particularly to restraints and/or eating or playing surfaces for attachment to such carriers.

SUMMARY OF THE INVENTION

An attachment to the side arms of a baby carrier is disclosed herein, which comprises a tray with a hinge attachment at one end which can be either pivoted like a hinge to lift the tray up and out of the way or disengaged entirely to separate the tray from the carrier. The hinge attachment contains both a hinge-type pivoting part and a latch part, the latter capable of insertion into an opening in the carrier arm. A hook on the latch part engages a flange on the carrier arm for locking the attachment in place. Release of the attachment and complete removal of the tray may be achieved by manually disengaging the hook from the flange.

In preferred embodiments, the opposite edge of the tray, across from the hinge attachment, carriers a fixed latch which passes through an opening in the opposite side arm of the carrier to engage a flange in a manner similar to the latch portion of the hinge attachment. The tray may thus be locked in place by insertion of both latches into the respective arms of the carrier. The non-pivoting latch may be released to swing the tray up without detaching it from the carrier, or both latches may be released to remove the tray entirely. In further preferred embodiments, the hinge attachment is a double-hinged connection, permitting a large degree of rotation through an arc well in excess of 180°.

BRIEF DESCRIPTION OF THE DRAWINGS

FIG. 1 is a perspective view of an illustrative embodiment of a carrier and attached tray in accordance with the present invention, the tray shown in a raised position.

FIG. 2 is a view of the hinge attachment of the embodiment of FIG. 1 shown in partial cutaway and with parts separated, together with points of attachment to the tray and to carrier side arm.

FIG. 3 is a view of the same parts shown in FIG. 3 rotated 90° and in partial cross section.

FIG. 4 is a view of a portion of the embodiment of FIG. 1 shown from a different perspective to illustrate the point of attachment of the swinging side of the tray to the side arm.

DETAILED DESCRIPTION OF THE INVENTION AND PREFERRED EMBODIMENTS

The perspective view of FIG. 1 shows a baby carrier 11 with a tray 12 attached thereto in accordance with the present invention. The carrier 11 may be of any of various constructions used for securing a child to an automobile car seat, a play swing, or any of various frames, structures or locations where a child may be placed during feeding, transport or play. Many of these carriers, such as that shown, may also be used in a free-standing manner. Tray 12 may be used as a table surface from which the child may be fed or on which toys may be placed for the child's amusement, or as a restraint to secure the child into the carrier, or both.

The carrier consists of a back rest 13, a seat 14 and side arms 15, 16. A rotating handle 17 serves a number of functions, including a grip for hand carrying, a stabilizing leg for holding the carrier in a free-standing upright position (as shown), and a mechanism for connecting the carrier to other structures such as an automobile seat attachment or a play swing frame. An example of the latter is shown in applicant's copending application Ser. No. 928,446, filed Nov. 7, 1986.

The tray attachment 12 is shown in a partially raised position to illustrate its pivoting capability. When lowered into place for use as either a table top, restraint or both, the tray rests on the two side arms 15, 16, and spans the space between them. A center post 18 extending downward from the other side of the tray will be situated between the legs of the child, further holding the child in place.

The side of the tray on the child's left (i.e., the right side in the view shown in the drawing) is secured to the left side arm 16 by a hinge-type connection 20 which permits rotation of the tray through a wide arc limited only by whatever structure the carrier is attached to or the base of the carrier itself. In the free-standing position shown, the total arc of possible rotation of the tray will be in excess of 180°, and the tray can be rotated until it rests on the floor or table surface on which the carrier is placed.

FIGS. 2 and 3 show the hinge connection 20 in detail, FIG. 3 being a combination of side and cross-sectional views of the parts shown in FIG. 2, the side edge 25 of the tray is shown at the top, and the side arm 16 of the carrier is shown at the bottom. The hinge connection 20 in this preferred embodiment has two parts, an upper part 26 and a lower part 27. These parts, together with the tray side edge 25 entail two pivot axes forming a double hinge. The first is the connection between the tray side edge 25 and the top half of the upper part 26 of the hinge connection. The tray side edge 25 contains a recess 28 to receive the upper part 26 of the hinge connection. Extending inward from the side walls of the recess 28 are a pair of opposing pins 29, 30 which extend into cooperating openings 31 in the upper part 26 of the hinge connection (only one such opening is shown in the drawing). Both pins and openings are circular, as is the contour of the top edge 32 of the hinge connection, providing free rotation of the tray with respect to the upper part. The pins 29, 30 and their respective holes 31 thus form the upper pivot axis.

A similar arrangement of pins and holes, although oppositely facing, forms the second (lower) pivot axis. The latter permits pivoting between the upper and lower portions 26, 27 of the hinge connection. The upper part 26 contains a recess 35 which receives a protruding section 36 on top of the lower hinge part 27. Extending outward from the sides of this protruding section 36 are a pair of pins 37, 38, which are in turn received in cooperating openings 39 in the side walls of the recess 35 (again, only one such hole is shown). The pins, holes, and lower contour 40 of the upper hinge part 26 are circular here as well, permitting rotation of the two hinge parts with respect to each other. The combination of the two pivot axes imparts an overall sweep to the tray over an arc well in excess of 180°.

Attachment of the hinge connection 20 to the side arm 16 of the baby carrier is achieved by insertion of the lower hinge part 27 through an opening 45 in the tray side arm 16. A hook 46 at the bottom lower hinge part engages a flange 47 which extends downward from the upper edge of the side arm 16. In preferred embodiments, such as that shown, the hook 46 is an extended protrusion, forming an elongate shoulder 48 which engages the lower edge 49 of the flange 47. The opening 45 is accordingly in the shape of a slot. As seen in FIG. 3, the hook 46 is wedge-shaped in cross section, permitting easy insertion into the slot-shaped opening 45. A series of ribs 50 on the outer surface of the tray side arm, facing the underside of the flange 47, serve to guide the lower hinge part 27 during its insertion through a slot-shaped opening 45, and to hold the hook shoulder 48 in engagement with the lower edge 49 of the flange 47. All parts, including the hook 46 and the walls surrounding the opening 45 are of resiliently deformable material which deforms sufficiently under contact pressure to permit insertion of the parts, then instantly regaining their original shape to render the parts in locking engagement. Release of the hinge connection from the side arm is achieved by pressing inwardly on the exposed surface 51 of the hook 46 in the direction of the arrow 52 until the shoulder 48 clears the lower edge 49 of the flange and the hook 46 may be lifted up through the opening 45.

The side of the tray 12 opposite the side bearing the hinge connection 20 is shown in FIG. 4. Extending downward from this side edge 60 of the tray is a tab 61 terminating in a hook 62, the tab and hook being of the same general shape and dimensions as the lower hinge part 27 shown in FIGS. 2 and 3. A slot 63 in the side arm 15 of the carrier receives the tab and hook. The hook forms a shoulder 64 extending outward, which engages the lower edge 65 of a flange 66 along the side arm 15 in the same manner as the lower part of the hinge connection on the opposite side. In particularly preferred embodiments, the tab 61 is angled slightly outward (i.e., toward the flange) to urge the hook 62 into engagement with the lower edge 65 of the flange. Again, the tab and hook are made of a resilient, deformable material which permits release of the hook from the flange by inward manual pressure on the exposed hook surface 67.

The foregoing is offered primarily for purposes of illustration. It will be readily apparent to those skilled in the art that many of the structural features disclosed herein may be modified somewhat in terms of shape and operation while still remaining within the spirit and scope of the invention.

What is claimed is:

1. In a baby carrier including a seat, a pair of spaced-apart side arms, and a removable tray having opposite side edges of sufficient width to span said side arms, said tray having a pair of tabs, each extending downwardly from an opposite side edge of said tray, for releasable engagement with openings in respective of said side arms, the improvement comprising one of said pair of tabs defining a pivotal member by being formed of first and second sections joined by a hinged connection whose axis is parallel to said opposite side edges, said first and second sections together permitting rotation of said tray through an arc exceeding 180 degrees.

2. A baby carrier tray in accordance with claim 1, and further characterized by a hook on the end of each of said tabs for locking engagement with the opening in said respective side arm.

3. A baby carrier in accordance with claim 2, wherein the locking engagement of said hook is with a flange disposed approximate said opening.

4. A baby carrier tray in accordance with claim 3, wherein said tabs are formed of resiliently deformable construction which, when inserted into respective of said openings, so that said hooks are urged into locking engagement with said flange.

5. A baby carrier tray in accordance with claim 3 in which said hook, once engaged by said flange, is releasable therefrom by manual pressure in a direction transverse to said flange.

6. A baby carrier tray in accordance with claim 5 in which said hook, once engaged by said flange, opens outward with respect to said baby carrier.

7. A baby carrier tray in which claim 5 in which said hook defines an elongate shoulder for engagement with the edge of said flange.

8. A baby carrier tray in accordance with claim 1 in which said pivoting member is flat and said opening is a slot.

9. A baby carrier tray in accordance with claim 5 in which said hook has a wedge-shaped cross section to facilitate insertion into said slot.

* * * * *